United States Patent [19]

Seeman et al.

[11] Patent Number: 4,607,352

[45] Date of Patent: Aug. 19, 1986

[54] METHOD AND APPARATUS FOR OBTAINING A DISPLAY OF A CHARACTERISTIC OF THE PERIPHERY OF A WELL

[75] Inventors: Bronislaw Seeman, Missouri City, Tex.; François J. Cortet, Paris, France

[73] Assignee: Schlumberger Technology Corporation, New York, N.Y.

[21] Appl. No.: 523,821

[22] Filed: Aug. 15, 1983

[30] Foreign Application Priority Data

Aug. 19, 1982 [FR] France ............................. 82 14348

[51] Int. Cl.⁴ .................................................. G01V 1/40
[52] U.S. Cl. .......................................... 367/35; 367/69;
  181/105; 346/33 WL; 364/422
[58] Field of Search ................... 367/35, 9, 68, 69, 71,
  367/115; 181/105; 346/33 WL, 33 C, 107 SC,
  107 N; 364/421, 422

[56] References Cited

U.S. PATENT DOCUMENTS

| 3,402,388 | 9/1968 | Tucker | 340/18 |
|---|---|---|---|
| 3,502,169 | 3/1970 | Chapman, III | 181/0.5 |
| 3,680,042 | 7/1972 | Brunn | 340/18.18 |
| 3,697,937 | 10/1972 | Ingram | 340/15.5 A |
| 3,728,672 | 4/1973 | Dennis et al. | 367/69 |
| 3,729,705 | 4/1973 | Grijalva | 367/35 |
| 3,952,282 | 4/1976 | Zemanek, Jr. | 340/15.5 |
| 3,961,306 | 6/1976 | Anstey | 340/15.5 DS |
| 4,084,259 | 4/1978 | Cahill et al. | 358/296 |
| 4,210,964 | 7/1980 | Rogers et al. | 364/578 |
| 4,352,166 | 9/1982 | Schoonover | 367/69 |
| 4,397,004 | 8/1983 | Branislaw | 367/43 |
| 4,428,072 | 1/1984 | Johns, Jr. | 367/69 |

FOREIGN PATENT DOCUMENTS

| 1052465 | 4/1979 | Canada | 367/35 |
|---|---|---|---|
| 2279117 | 2/1976 | France | |

OTHER PUBLICATIONS

Aguillera, "Practical Log Analysis Pt. 22", 9/10/79, Oil Gas J., vol. 77, No. 37, pp. 126-128 abst. attached.
Grosmangin et al, "A Sonic Method . . . Borehole Casings", 2/61, pp. 165-171, Soc. Petr. Eng., 35th Anniv. Mtg. of SPE.
Suman, G. O. Jr., et al. "Cementing Oil and Gas Wells", World Oil, vol. 185, No. 6, Nov. 1977, pp. 79-92.

*Primary Examiner*—Nelson Moskowitz
*Attorney, Agent, or Firm*—Stephen L. Borst

[57] ABSTRACT

The apparatus and method of the present invention pertain to visual presentation systems employing scan lines, wherein each scan line is divisible into sets of points respectively corresponding to locations at which well measurements are made. The resulting sets are shaded in accordance with the value of the respective measurements. Harsh transitions between adjacent sets are removed by having a parameter evaluated for each point of the scan line in accordance with (a) the spatial relationship of a subset of points which includes the point to adjacent sets of points; and (b) the well measurement made at the location to which the point corresponds. The parameter value is compared with a randomly or pseudo-randomly generated number, and the point is marked if the result of the comparison satisfies a preselected relationship. The parameter is evaluated and the comparison is made for all other points in the scan line.

20 Claims, 8 Drawing Figures

METHOD AND APPARATUS FOR OBTAINING A DISPLAY OF A CHARACTERISTIC OF THE PERIPHERY OF A WELL

BACKGROUND OF THE INVENTION

This invention relates to displays for the study of a characteristic associated with a well, and more particularly to a method and apparatus for producing a graphic recording of a characteristic of the periphery of a well, such as for example the quality of the cement bond around a casing.

Oil well completion operations for initial production begin with the placement of a casing and the injection of cement between the casing and the surrounding earth formations. The main function of the cement is to isolate the formations so as to avoid the flow of fluids along the casing between aquifer layers and other formations containing hydrocarbons. It is thus very important to know the bonding quality of the cement around the casing.

A logging apparatus for obtaining this information is described in U.S. Pat. No. 4,255,798, issued Mar. 10, 1981 to Havira, which hereby is incorporated herein by reference. In one embodiment, the downhole apparatus comprises several (for example, eight) acoustic transducers positioned helically around the body member for the inspection of the entire casing periphery. A signal is generated that is representative of the bonding quality of the cement on the part of the casing corresponding to the exploration field of this transducer.

One advantage of this apparatus is that it allows the study of the bonding of the cement on surfaces of limited size on the periphery of the casing, thereby making it possible to identify communication channels between certain formations even when the average quality of the cement appears to be good. One of the difficulties encountered has to do with the recording of the results. In fact, if a conventional plot on a film medium is made of the output signal as a function of depth, a number of curves are obtained which are not directly utilizable and which are often even difficult to separate from each other. In addition, it is desirable to provide other data, for example the average quality of the cement, thus further complicating the representation.

Logging techniques for furnishing a continuous visual representation of the wall of the borehole or of the formation layers around it are described in Canadian Pat. No. 685,727 (Mann & Threadgold). Signals coming from current electrodes are used for the intensity modulation of an oscilloscope. The purpose is to obtain an image of the limits between the formation layers in order to deduce the dip; accordingly, the boundaries between the changes in the recording shade give the desired information of the layer limits. The shades themselves, which correspond to resistivity values, are strictly speaking of no interest. In addition, a spot whose intensity is modulated in proportion to the amplitude of the signal does not give a satisfactory distribution of shades for the objects of this invention.

One advantageous technique for the graphic presentation of measurements of the bonding quality of the cement between a casing and the wall of a borehole is described in copending application Ser. No. 304,887, filed Sept. 23, 1981. A plurality of measurements are carried out as a function of depth in directions distributed uniformly around the axis of the well, as taught in the aforementioned Havira patent. These measurement signals are converted into respective quantified signals having a limited number of possible values. A shading code is selected for each such measurement signal based on the quantified value thereof. For each depth level, a line modulated by the selected shading codes is displayed, producing over a plurality of depth levels parallel longitudinal bands. Hence, each band comprises a succession of shaded zones, the darker zones representing regions of high compressive strength, i.e. good bonding quality.

While this form of presentation provides a relatively clear picture of the condition of the periphery of the well, the presentation tends to take on a somewhat artificial or excessively geometrical appearance due to uniformity of the pattern for each value of the characteristic. Moreover, the graphic transitions between different values of the characteristic measured for neighboring zones of the well can appear relatively harsh.

SUMMARY OF THE INVENTION

Accordingly, it is an object of the present invention to overcome, by use of novel methods and apparatus, the difficulties of conventional systems for producing a graphic recording of a characteristic of a periphery of a well.

It is another object of the present invention to provide an improved visual presentation technique for measurements taken in a well, facilitating in particular the direct interpretation of the results of these measurements by the eye.

The method of the present invention pertains to visual presentations employing scan lines, wherein each scan line is divisible into sets of points respectively corresponding to locations at which well measurements are made. Each point may or may not be marked, in accordance with the present invention, so that the resulting density of marks of the point sets is interpreted by the eye as a shading in accordance with the value of the respective well measurements. In particular, a parameter is evaluated for each point of the scan line in accordance with (a) the spatial relationship of a subset of points which includes the point to adjacent sets of points; and (b) the well measurement made at the location to which the point corresponds. The parameter value is compared with a randomly or pseudo-randomly generated number, and the point is marked if the result of the comparison satisfies a preselected relationship. The parameter is evaluated and the comparison is made for the other points in the scan line. The method may include transforming either the random numbers or the well measurements to further improve the presentation.

A preferred apparatus in accordance with the present invention comprises means for scanning a line of points and means for exciting a point of the scan line in response to the output of an examining means. The examining means receives an output of a random number generator and, for each point of the scan line, examines whether a well measurement made at a location to which the point corresponds and said random number satisfy a predetermined relationship. The results of the examination are provided to the excitation means for marking the point if the relationship is satisfied. The examining means may include means for modifying the well measurement as a function of the spatial relationship of the point relative to sets of points representing locatons adjacent to the location to which the point corresponds. Moreover, the examining means also may include means for transforming the well measurements or the random numbers to improve the distribution of gray levels.

BRIEF DESCRIPTION OF THE DRAWINGS

In the drawings, where like reference characters indicate like elements.

DETAILED DESCRIPTION OF THE PREFERRED EMBODIMENTS

The priority document, French application Ser. No. 82.14348 filed Aug. 19, 1982, hereby is fully incorporated herein by reference.

Figure 1:
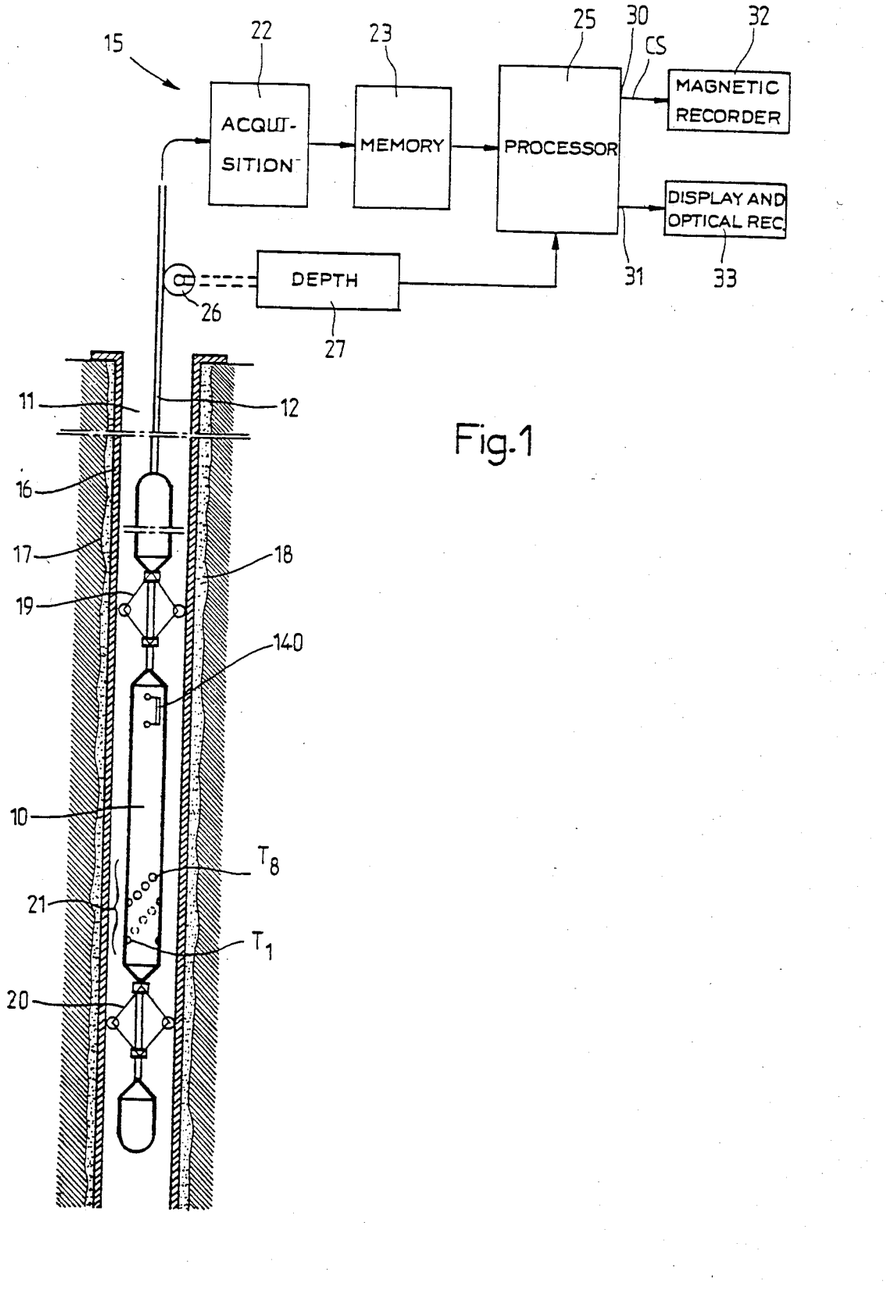
FIG. 1 illustrates a system for measuring a physical characteristic of a well and for depicting the measurements in accordance with the present invention.

An acoustic logging device comprising a downhole tool or sonde 10 is shown in FIG. 1 suspended in a well 11 at the end of a multi-conductor cable 12. Cable 12 allows movement of the sonde 10 in the well to be controlled and allows communication between the sonde 10 and surface equipment 15. The well 11 is cased with steel casing 16. The volume between the wall 17 of the hole bored in the geological formations and the external face of the casing 16 nominally is filled with injected cement 18. The sonde 10 is maintained in a position substantially coaxial with the casing 16 by centering devices 19 and 20.

The sonde 10 may be equivalent to the apparatus disclosed in the aforementioned Havira patent. Sonde 10 comprises an array 21 of eight acoustic transducers T1 to T8 arranged helically so as to inspect portions of the casing 16 in azimuths uniformly distributed around the axis of the well 11. In this example, each of the transducers is oriented in a direction forming an angle of 45° with the direction of the neighboring transducers in a plane perpendicular to the axis of the well 11.

According to the logging technique described in the aforementioned Havira patent and copending patent application, signals output by the transducer array 21 are transmitted via the cable 12 to an acquisition device 22 on the surface, and then to a memory 23 which is accessible to a processor 25. The processor 25 receives indications of depth from a cable movement detector comprising a wheel 26, which bears tangentially on the cable, and pulse generator 27, which is responsive to the output of wheel 26 to deliver to the processor 25 a pulse whenever the sonde 10 moves a predetermined unit of length. Measurements performed periodically by the transducers T1 to T8 are stored and processed. The processing includes depth-shifting the measurements of the respective transducers T1–T8 to obtain at the output 30 of the processor, for each determined depth increment (e.g., 15 centimeters) a series of eight digital signals CS1 to CS8 corresponding to respective measurements of the compressive strength of the casing 16 and cement 18 in the eight azimuths at which the transducers T1–T8 are oriented. The signals CS1–CS8 from the output 30 are recorded magnetically by a digital recorder 32, level by level. The processor 25 also delivers signals CS1–CS8 and other signals as well (detailed below) on an output 31 to a display and optical recording device 33 as represented in FIG. 2.

Figure 2:
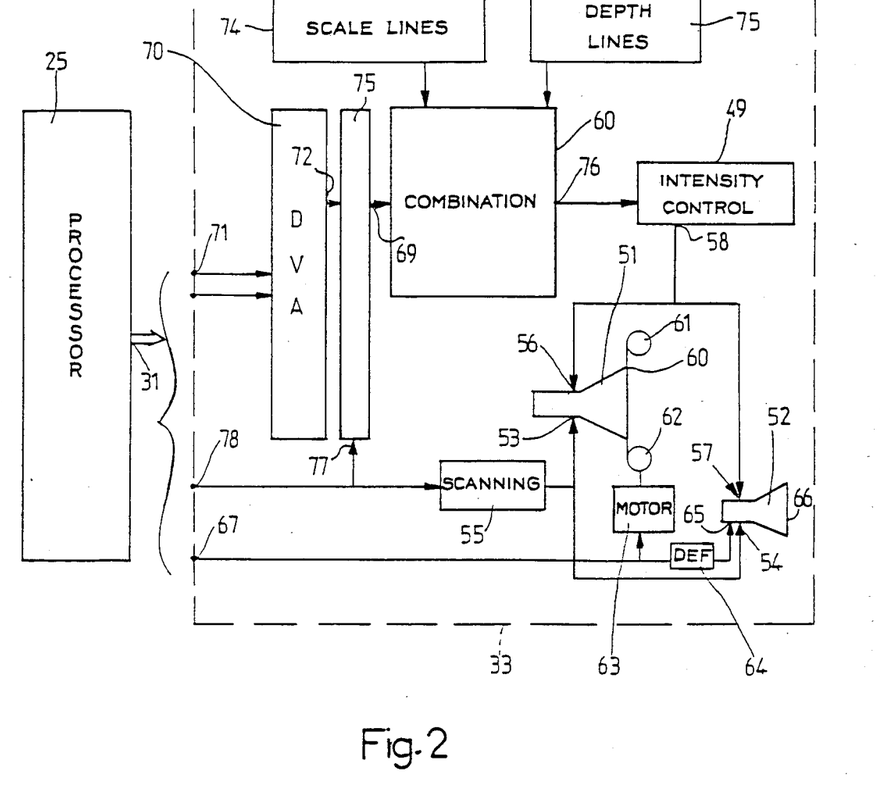
FIG. 2 is a schematic diagram illustrating the display and optical recording circuits of an apparatus suitable for use in the system of FIG. 1.

The display and optical recording device 33, shown in detail in FIG. 2, comprises cathode ray tubes 51 and 52, the tube 51 being for graphic recording and tube 52 being for direct display. Tubes 51 and 52 receive, on respective inputs 53 and 54, a scanning voltage coming from a circuit 55. The scanning voltage deflects the respective beams of tubes 51 and 52 along a linear direction between a minimum abscissa and a maximum abscissa to produce a scan line. Tubes 51 and 52 receive on their respective inputs 56 and 57 a spot excitation control signal coming from the output 58 of an intensity control device 49 operating on an ON or OFF basis. Device 49 is controlled from the output 76 of a combination device 60.

Whenever a signal is present on the output 76, the intensity of the respective spots of the tubes 51 and 52 goes from a zero level to an illumination level capable of producing the appearance of a mark on their respective screens. The tube 51 exposes a film 60 moving on reels 61 and 62. The film 60 is driven by a capstan with a stepping motor 63 at a rate corresponding to the duration of the beam scan. The movement of the film 60 is perpendicular to the scan direction and corresponds to depth. For this purpose, the motor 63 is supplied by pulses along line 67 from the processor 25. Each pulse corresponding to an increment that is a sub-multiple of the depth interval separating each measurement sample. The depth interval preferably is 15 centimeters. Line 67 also supplies pulses to a deflection voltage generator 64, which in turn is coupled to a deflection input 65 of the tube 52. The circuit 64 causes the deflection of the beam in a perpendicular direction. The observation screen 66 of the tube 52 has persistence so as to allow the display of the measurements over a predetermined depth interval of the well. The image may be updated periodically or offset progressively by well-known means, which are not shown.

The display and optical recording device 33 further comprises a DVA (Digital Video Access) memory 70 comprising in this example a buffer register having 1750 bits, which correspond respectively to 1750 points per scan line at the tubes 51 and 52. Of the 1750 points, 384 are intended for the display of the compressive strength measurement values which represent the quality of the cement bond. As these values come from the eight transducers T1–T8, the number of display points per transducer for a given depth is u=48. The DVA memory 70 is addressed by processor 25 along line 71 of the device 33 for the entry of a 1 or 0 value, depending on whether or not a mark is desired at the corresponding point of the scan line on the recording medium 60 or on the display medium 66.

The contents of DVA memory 70 are read sequentially and in synchronization with the scanning of each line by a read circuit 75, the output 69 of which is connected to an input of the combination circuit 60. Combination circuit 60 is also supplied by a scale line generating circuit 74 and a depth line generating circuit 75. Combination circuit 60 energizes the intensity control circuit 49 to produce a mark whenever a bit of level 1 appears on the output 76. The read circuit 75 receives a synchronization signal at its input 77. The synchronization signal originates at processor 25 and is supplied along line 78 of the device 33. Line 78 also supplies the synchronization signal to the scanning circuit 55 to synchronize the appearance of a mark with the position of the beam, in accordance with the information to be transmitted. The organization of such a circuit is explained in detail in French Pat. No. 2,081,628 (Elliott).

Figure 3A:
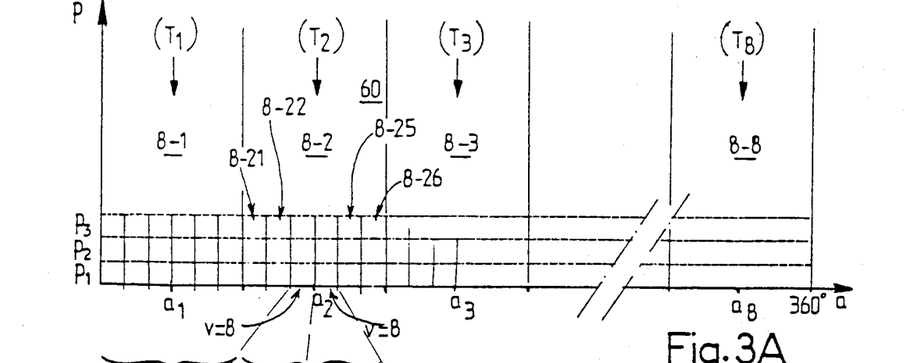
FIGS. 3A and 3B are drawings useful in explaining the plotting of marks on a display or recording medium, in accordance with the present invention.

FIG. 3A represents a portion of the film 60. The measured compressive strengths are recorded as a function of depth along the axis p and as a function of azimuth along the transverse axis a. The eight longitudinal bands 8-1 to 8-8 correspond respectively to eight bands investigated at the periphery of the well by transducers T1-T8. For each scan line, therefor, eight sets of points correspond respectively to eight locations investigated by transducers T1-T8. Parallel to the azimuth axis a are aligned 384 points for the presentation of the information obtained for each of the depth levels $p_1$, $p_2$, etc. The data coming from the transducers T1 to T8 (azimuths $a_1$ to $a_8$) have been previously depth-shifted by the processor 25.

Each of the bands 8-1 to 8-8 is divided into a preselected number of sub-bands. For each scan line, therefor, each set of points is divided into a preselected number of subsets of points. For example, if a division into six sub-bands is selected, the sub-bands can be represented by indices 1 to 6 (for example, for the band 8-2, noted as 8-21 to 8-26). Each sub-band includes a number v of points (identified indiscriminately as 89 in FIG. 3B) aligned at each depth. The value of v may be eight, for example. These points 89 are represented by squares for the two sub-bands 8-23 and 8-24 in FIG. 3B.

Figure 3B:
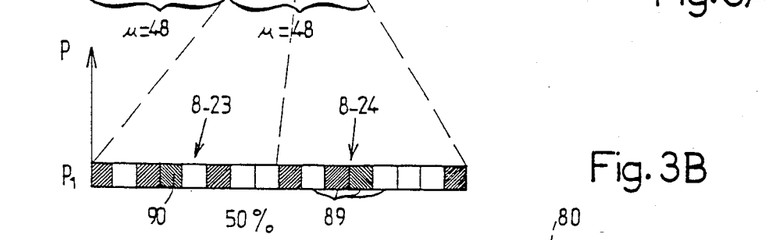

For each point in the sub-band of band 8-2, for example, a mark (as illustrated at 90 for example) is plotted if a number taken at random between two limits A and B (identical for all the points of the scan line $p_1$ and representing lower and upper limit values of the compressive strength) is lower than the value CS2 measured by the transducer T2. Otherwise, the point is left blank. The result is that the distribution density of marks such as 90 along the line $p_1$ for the sub-bands 8-21 to 8-26 corresponds to the value of the characteristic measured by the transducer T2 for the depth $p_1$. In the example of FIG. 3B in which are shown eight marks 90 distributed randomly among the 16 points of the sub-bands 8-23 and 8-24 (50% density), the representation corresponds to an intermediate value of the compressive strength.

The appearance of the representation thus obtained can be modified by the choice of the values A and B. The larger the sum A+B, the brighter the general tonality. Also, the smaller the difference B-A, the greater the contrast that will be obtained.

This presentation technique provides good continuity of the variations in tonality along each sub-band according to the variations in the compressive strength values measured with depth. Furthermore, the random distribution of the marks 90 makes it possible to obtain relatively uniform grey tonality for constant values of the compressive strength.

The continuity of the presentation is improved further along each depth band (such as $p_1$, $p_2$, $p_3$) by carrying out for each sub-band an interpolation according to the spatial relationship of the sub-band to the spatially adjacent bands corresponding to azimuthally adjacent transducers. For each point of the sub-band 8-21, for example, the respective random number is compared with a value $$R1 = \tfrac{1}{3}CS1 + \tfrac{2}{3}CS2 \tag{1}$$

where CS1 and CS2 are respectively the values measured by the transducers T1 and T2 for the depth $p_1$. For each point of the sub-band 8-22, the respective random number is compared with a value:

$$R2 = \tfrac{2}{3}CS1 + \tfrac{1}{3}CS2 \tag{2}$$

For the sub-bands 8-25 and 8-26, the random numbers are compared respectively with the numbers:

$$R5 = \tfrac{2}{3}CS3 + \tfrac{1}{3}CS2 \tag{3}$$

$$R6 = \tfrac{1}{3}CS3 + \tfrac{2}{3}CS2 \tag{4}$$

For the sub-bands 8-23 and 8-24 already mentioned, the values R3 and R4 are both equal to CS2.

Thus, for each of the bands 8-i are determined values R1 to R6 according to the respective values of CS(i−1), CS(i) and CS(i+1). In accordance with this method, it is possible to produce continuity in the presentation of the results, in the direction transverse to the depth, on the recording or the display screen.

Other interpolation formulae may be used. For example, a particular value Rj may be calculated for each point of the scan line according to the position j of the point relative to points corresponding to azimuthally adjacent transducers.

Figure 6:
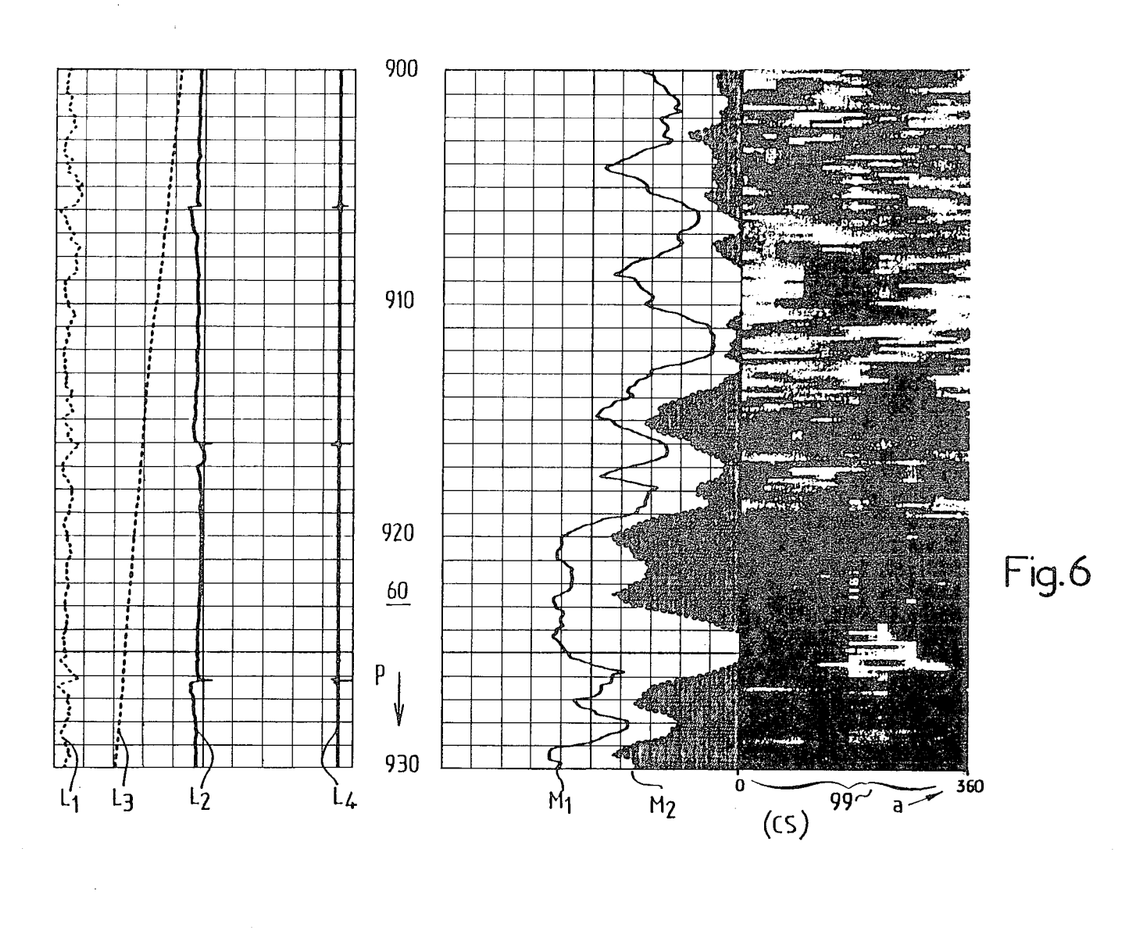
FIG. 6 is a pictorial representation of an optical recording obtained in accordance with the present invention.

FIG. 6 represents a recording obtained in accordance with the present invention. The vertical depth scale is in the direction p. The recording shows in the transverse direction, from left to right: (a) a series of four logging curves or diagrams L1 to L4 on respective transverse scales; (b) two calculated curves M1 and M2, and; (c) between the azimuths 0 and 360°, a surface presentation 99 obtained according to the principles described above. The width of the diagram of FIG. 6 corresponds to the capacity of 1750 points of the DVA memory 70, and the interval between each point on the graph is 0.13 millimeter. In the presentation 99, the lightly shaded zones correspond to locations of the well wall where the quality of the cement bond is poor. Extended lightly shaded areas in the direction of depth, e.g. area 97, indicate channels through which is liable to be established an undesirable communication between different fluid-bearing zones.

It has been observed that results more satisfactory from the viewpoint of the distribution of grey levels is obtained by applying a transformation function to the values of the compressive strength. Such a function can take on the form:

$$f(r) = \log_2(r+1) \tag{5}$$

in which $\log_2$ represents the base-2 logarithm function, and r is a reduced compressive strength defined by:

$$r = \frac{CS - A}{B - A} \tag{6}$$

A and B being the predetermined limit values of the range of the compressive strength and CS representing a value of the compressive strength measured at one location.

In fact, the same effect may be simply achieved in real-time processing operations by applying the inverse transformation to each random number, namely:

$$f^{-1}(X) = 2^X - 1 \tag{7}$$

X being a random number. A value V then is found to be $$V = g[f^{-1}(X)] = y(B-A) + A \tag{8}$$

where $y = f^{-1}(X)$. The value V is compared with the value CS to determine whether or not a mark should be entered at the point of the graph corresponding to the value CS and for which the random number X has been drawn.

Figure 4:
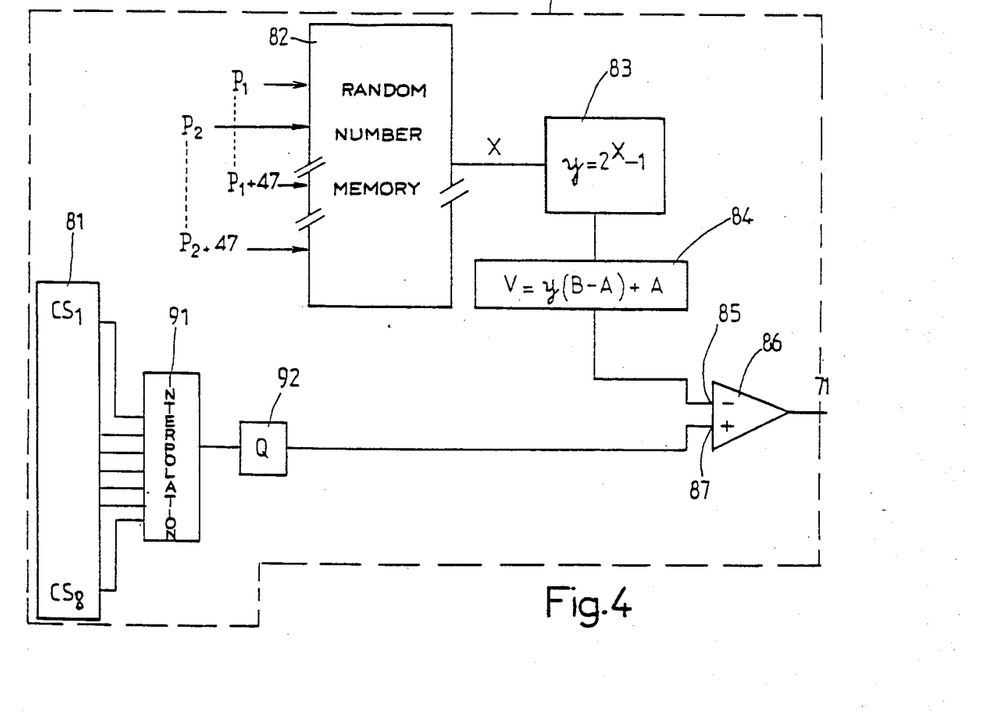
FIG. 4 is a schematic diagram illustrating a processing circuit in accordance with the present invention.

A circuit 80 is shown schematically in FIG. 4. Circuit 80 is equivalent from the functional viewpoint to the processor 25 for the generation of a "mark" or "no mark" decision at each point of each scan line of the graph 99. The compressive strength values CS1 through CS8 are stored in a memory 81 in which they are maintained for the number of scans selected to cover the depth interval of 15 centimeters. However, the contents of the DVA memory 70 are updated before the generation of a respective scan line of the display and optical recording device 33. For the first point of a scan line, a pointer $P_1$ is drawn at random. Pointer $P_1$ corresponds to an address of random number memory 82. Memory 82 has 256 addresses, each having a 16-bit number generated randomly or pseudo-randomly before the operation. The respective random numbers for 48 consecutive points of a scan line are chosen as the 48 successive numbers read from addresses $P_1$ through $P_1 + 47$ of memory 82. These numbers, which are between 0 and 1, are read successively by a transformation module 83 which calculates the function $2^X - 1$, which is again transformed in a module 84 to produce, at an input 85 of a comparator 86, a numerical indication corresponding to $V = (2^X - 1)(B - A) + A$. The other input 87 of comparator 86 receives a numerical value of the compressive strength Q of a register 92 loaded by an interpolation module 91. The module 91 determines Q from the reading of a selected one of the values CS1–CS8 in the memory 81 and the rank of the point considered on the graph along the scan line in accordance with the relationships R1 to R6 previously defined.

According to an alternative embodiment, the memory 82 is loaded directly by the numbers V. The transformation operation performed by modules 83 and 84 is thus avoided during the processing of each new point.

The output of the comparator 86 produces a recording signal for a level-1 bit in the DVA memory 70 when the signal on the input 87 is greater than the signal on the input 85. Upon reaching the 49th point of the line scanned on the diagram (passage from band 8-1 to band 8-2), a new address marker $P_2$ is drawn at random from among the 256 inputs of the table 82 for the resumption of the process for the points of the band 8-2.

Figure 5A:
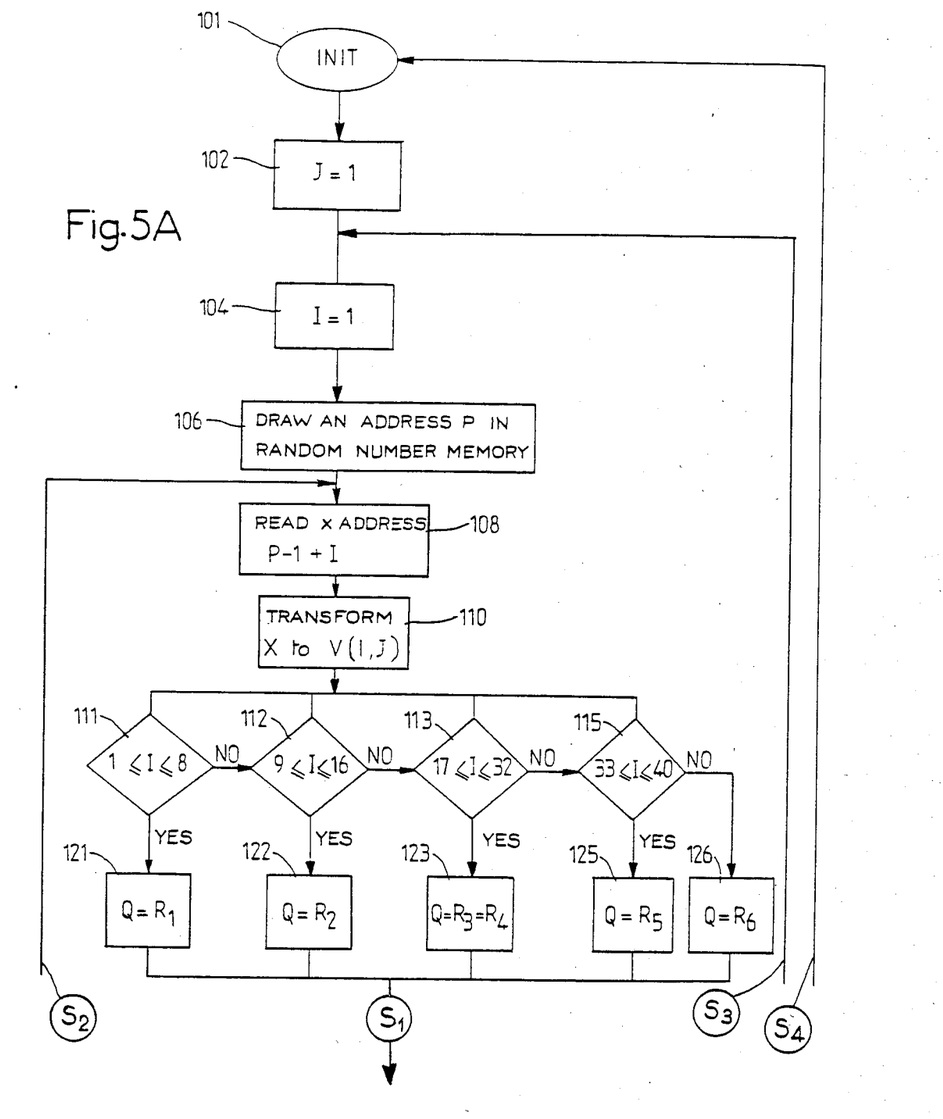
FIG. 5 is a flowchart illustrating operations for the implementation of the method of the present invention.
Figure 5B:
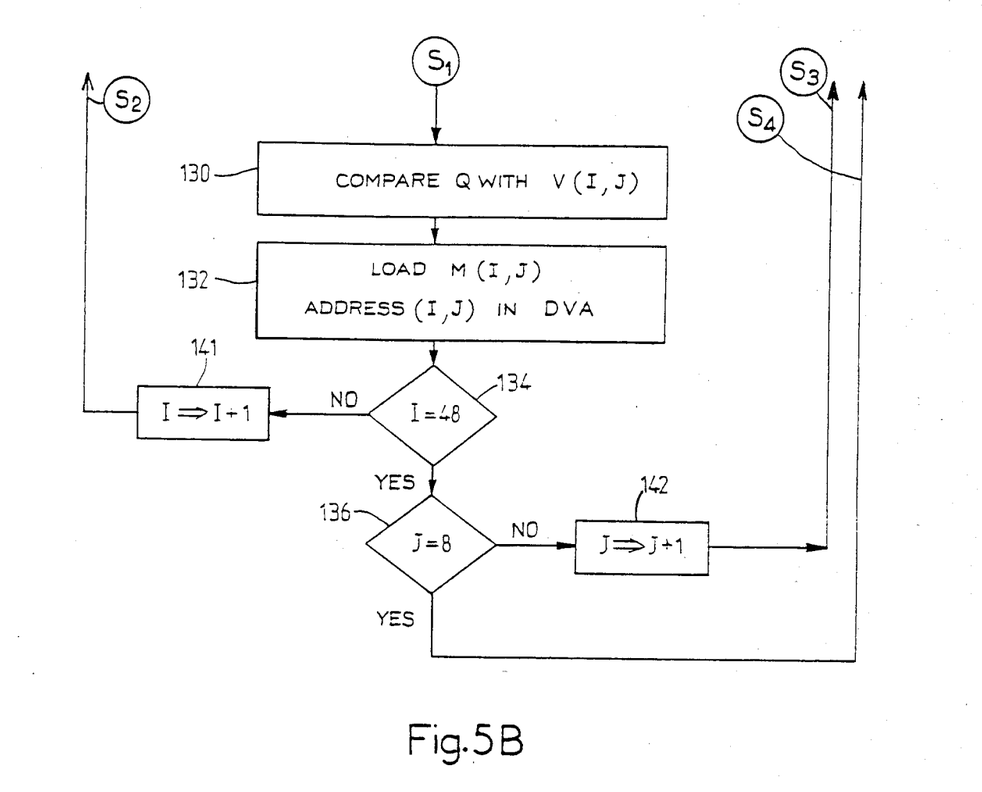

FIG. 5 illustrates the operation of the processor 25 for the production of marks on a scan line according to the measurements CS1–CS8 obtained for a given depth, where the processor 25 may be any suitable computer system. The process is initialized by a signal (block 101) followed by the setting of an index J to correspond to the rank of the transducer that provided the measurement to be displayed, or which amounts to the same thing, the band 8-1 to 8-8 (block 102). In block 104, an index I is set to correspond to the rank of the considered point inside the selected band 8-1. Initially, I and J are set to 1. Then, an address P relating to a memory of random numbers is drawn (block 106). The random number X is then read at the address $P - 1 + I$ (block 108) and transformed into $V(I,J) = y(B-A) + A$ (block 110). Alternatively, the random number may be generated and then transformed at step 110. Alternatively, the random numbers X may be transformed prior to storage in the random number memory, eliminating the transform step 110.

The value of the counter I is then analyzed to determine in which sub-band the considered point is located, namely sub-band of index 1 (block 111), sub-band of index 2 (block 112), sub-bands of indices 3 and 4 (block 113), sub-band of index 5 (block 115) or sub-band of index 6 (NO output of block 115). According to the results of this test (YES outputs of blocks 111 to 115 or NO output of block 115), the value Q is determined from the measurement CS(J) according to the respective relationship R1 to R6 (blocks 121, 122, 123, 125 and 126). The value of Q thus determined is compared with that of V(I,J) obtained after the operation of the block 110 (block 130). The result of this comparison is a bit M(I,J) of 0 or 1 value depending on whether or not V is greater than Q. The value M(I,J) is loaded into the DVA memory 70 (block 132) at the address corresponding to the point of index I in the band J.

If I is lower than 48 (block 134), the counter I is incremented by one unit (block 141) to scan the next point and we come back to the input of the block 106. If I is equal to 48, we examine whether J is equal to 8 (block 136). If not, J is incremented by one unit (block 142) to scan the next band (FIG. 3A) and we come back to the input of block 104. On the other hand, if J is equal to 8, it is the indication that the filling of the DVA memory, as concerns one scan line of the presentation 99, is terminated and we come back to the initialization block 101.

The DVA memory 70 is then ready to be read by the read device 75 for the display and recording of the corresponding scan line by the tubes 51 and 52.

Of course, if the calculation power of the processor 25 is sufficient, it is possible to generate a random number directly for each address of the memory 70 considered. The use of a table such as 82 makes it possible to accelerate the operating speed without degrading the quality of the results. Of course, the random number capacity of this memory is arbitrary.

In the case of deviated wells, the sonde 10 is inclined so that one of the transducers T1 to T8 is on a generatrix whose intersection with a cross-section of the tool is at a higher level than that of the generatrices of the other transducers. It is sometimes desirable to keep the presentation of the measurements coming from the highest transducer in a predetermined one of the bands 8-1 to 8-8, whatever the rotation of the sonde in the well. It is preferable to choose the band 8-1, i.e. the left-most band in diagram 99. This can be accomplished when the sonde is equipped with an imbalance device, shown schematically at 140 in FIG. 1, which constantly furnishes a measurement (which can be brought up to the surface via the cable 12) of an angle RB between the generatrix of the transducer T1 and the upper generatrix defined earlier. We then begin to load the part of the DVA memory 70 corresponding to the presentation 99 at an address corresponding not to the azimuth 0 but to the azimuth RB.

In other words, this portion of the DVA memory 70 is considered to be a circulating memory of 48 bytes. We begin the loading of M(1,1) (block 132) of FIG. 5 at a relative address given by the formula $$\frac{360 - RB}{360} \times 48 \qquad (9)$$

when the highest address position of the memory 70 is filled, the introduction is pursued from the lowest address position until the 348 bits corresponding to a scan have been stored in memory.

While the invention has been described in accordance with the preferred embodiments as presently conceived, it is to be appreciated that the preferred embodiments are illustrative and that the invention is not intended to be limited to the preferred embodiments. Modifications of the present invention not described herein will become apparent to those of ordinary skill in the art after a perusal of this disclosure. For example, the casing thickness determination taught by the aforementioned Havira Patent may be displayed in accordance with the present invention. Such modifications, as well as other equivalent methods and arrangements, are within the spirit and scope of the invention as expressed in the appended claims.

What is claimed is:

1. A method for producing a visual presentation of a physical characteristic of a well measured at a plurality of locations in the well, a scan line of the visual presentation having respective sets of points corresponding to said locations, comprising the steps of:
   obtaining a random number lying within a range determined in accordance with a minimum and maximum value of the characteristic;
   identify a point of said scan line;
   evaluating a parameter in accordance with: (a) a spatial relationship of a subset including said identified point, to sets of points adjacent the set including said inclusive subset, and (b) a value of the characteristic measured at the one of said locations corresponding to said inclusive set;
   comparing said randomly selected number and said parameter;
   marking said identified point if the result of said comparison step satisfies a preselected relationship; and
   repeating said obtaining, identfying, evaluating, comparing and marking steps for the other points in said scan line.

2. A method as in claim 1 wherein said measured value is a transformed measured value.

3. A method as in claim 1 wherein said randomly selected number is a transformed randomly selected number.

4. A method as in claim 1 wherein:
   each of said subsets comprises eight points;
   each of said sets comprises six subsets; and
   said spatial relationship is represented by one of a group consisting of the expressions:

$R1 = \frac{1}{4}CS(i-1) + \frac{3}{4}CS(i)$ $R2 = \frac{1}{4}CS(i-1) + \frac{3}{4}CS(i)$ $R3 = CS(i)$ $R4 = CS(i)$ $R5 = \frac{1}{4}CS(i+1) + \frac{3}{4}CS(i)$ $R6 = \frac{1}{4}CS(i+1) + \frac{3}{4}CS(i)$ where CS is said measured value and i is an index of said inclusive set.

5. A method as in claim 4 wherein said measured value is a measured value transformed by $\log_2(((CS-A)/(B-A))+1)$, where CS is said measured value prior to transformation, A is said minimum characteristic value, and B is said maximum characteristic value.

6. A method as in claim 4 wherein said random number is a random number transformed as $(2^X - 1)(B - A) + A$, where X is said random number prior to transformation, A is said minimum characteristic value, and B is said maximum characteristic value.

7. A method as in claim 1 wherein said subset consists of said identified point.

8. A method for producing a visual presentation of a physical characteristic of a well measured at a plurality of locations in the well, comprising the steps of:
   obtaining a random number lying within a range determined in accordance with a minimum and maximum value of the characteristic;
   comparing a value of the characteristic measured at one of said locations with said random number;
   entering a mark on a visual presentation medium at a point within a band of said medium representing said one location if said comparing step satisfies a predetermined relationship; and
   repeating said obtaining, comparing and entering steps for each point within said band, whereby the density of the shading in said band is indicative of said measured value.

9. A method as is claim 8 further comprising the step of repeating said obtaining, comparing, entering, and first-mentioned repeating steps for each band at one depth level.

10. A method as in claim 9 wherein the number of points entered in said entering step for said one depth level is a multiple of the number of bands for said one depth level.

11. A method as is claim 9 further comprising the step of repeating said second-mentioned repeating step for a plurality of depth levels.

12. A method as in claim 8 wherein said bands correspond to respective azimuths of said locations.

13. A method as in claim 8 wherein said comparing step comprises the steps of:
   evaluating a parameter as a function of the value measured at said one location and values of the characteristic measured at locations adjacent to said one location; and
   comparing said parameter with said random number.

14. A method as in claim 8 wherein said minimum and maximum values are selected on the basis of tonality and contrast.

15. A method as in claim 8 wherein said physical characteristic is the bonding quality of cement between a well casing and a wall of the borehole.

16. An apparatus for producing a visual presentation of a physical characteristic of a well measured at a plurality of locations in the well, comprising:
   means for scanning a line comprising a plurality of individually excitable points, each of said points being identifiable with one of said locations;

means for providing a random number;

means for examining, for each point of said scan line, whether a value of the characteristic measured at the one of said locations to which said examined point corresponds and said random number satisfy a predetermined relationship; and means responsive to said examining means for exciting said examined point of said scan line if said predetermined relationship is satisfied, said scanning means being responsive to said exciting means.

17. An apparatus as in claim 16 wherein said examining means comprises means for modifying said measured value as a function of the spatial relationship of said examined point relative to sets of points representing locatons adjacent to the location to which said examined point corresponds.

18. An apparatus as in claim 17 wherein said examining means further comprises means for transforming said measured value to improve the distribution of gray levels.

19. An apparatus as in claim 17 wherein said examining means further comprises means for transforming said random number to improve the distribution of gray levels.

20. An apparatus as in claim 16 further comprising means for producing respective scan lines as a function of depth in the well.

* * * * *